(12) United States Patent
Wallin et al.

(10) Patent No.: US 6,701,793 B2
(45) Date of Patent: Mar. 9, 2004

(54) TORQUE SENSOR

(75) Inventors: Christer Wallin, Västerås (SE); Hans Ling, Spånga (SE); Lars Hassel, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 10/149,807

(22) PCT Filed: Dec. 14, 2000

(86) PCT No.: PCT/SE00/02537

§ 371 (c)(1),
(2), (4) Date: Jun. 13, 2002

(87) PCT Pub. No.: WO01/44770

PCT Pub. Date: Jun. 21, 2001

(65) Prior Publication Data

US 2002/0189372 A1 Dec. 19, 2002

(30) Foreign Application Priority Data

Dec. 14, 1999 (SE) ................................................ 9904572

(51) Int. Cl.⁷ .................................................. G01L 3/14
(52) U.S. Cl. ........................... 73/862.333; 73/862.334; 73/862.335
(58) Field of Search ...................... 73/862.333, 862.335, 73/862.336, 862, 862.08

(56) References Cited

U.S. PATENT DOCUMENTS

| 5,022,275 A | * | 6/1991 | Satoh et al. | ........... 73/862.335 |
|---|---|---|---|---|
| 5,442,508 A | * | 8/1995 | Smith | ........... 360/314 |
| 5,491,369 A | | 2/1996 | Ishino et al. | ........... 310/26 |
| 5,585,574 A | * | 12/1996 | Sugihara et al. | ........ 73/862.334 |
| 5,646,356 A | | 7/1997 | Ling et al. | ............. 73/862.335 |
| 6,145,387 A | * | 11/2000 | Garshelis | ............... 73/862.336 |

FOREIGN PATENT DOCUMENTS

| CN | 1030642 | 1/1989 | ............. G01L/3/10 |
|---|---|---|---|
| JP | 04-221726 | 8/1992 | ............. G01L/3/10 |
| JP | 10-176966 | 6/1998 | ............. G01L/3/10 |
| WO | 97/40354 | 10/1997 | ............. G01L/3/10 |

\* cited by examiner

*Primary Examiner*—Edward Lefkowitz
*Assistant Examiner*—Andre Allen
(74) *Attorney, Agent, or Firm*—McCormick, Paulding & Huber LLP

(57) ABSTRACT

The present invention relates to a magnetostrictive sensor for measuring a torque in a shaft. The sensor comprises at least one active magnetostrictive region on the shaft, a surface pattern in the magnetostrictive region such that it obtains anisotropic properties, a first means arranged to generate a magnetic field varying in time in the magnetostrictive region and a second means arranged to sense variation in the permeability in the magnetostrictive region. Said magnetostrictive region comprises a first layer of a magnetostrictive material which is provided on the surface of the shaft and that said surface pattern is formed by a second layer of a non-magnetostrictive material comprising a low resistivity.

19 Claims, 1 Drawing Sheet

TORQUE SENSOR

CROSS-REFERENCE TO RELATED APPLICATIONS

This application is entitled to the benefit of and incorporates by reference essential subject matter disclosed in International Application No. PCT/SE00/02537 filed on Dec. 14, 2000 and Swedish Patent Application No. 9904572.6 filed on Dec. 14, 1999.

BACKGROUND OF THE INVENTION AND PRIOR ART

The present invention relates to a magnetostrictive sensor for measuring torque in a shaft, wherein the sensor comprises at least one active magnetostrictive region of the shaft, a surface pattern on the magnetostrictive region such that it obtains anisotropic properties, a first means arranged to generate a magnetic field varying in time in the magnetostrictive region and a second means arranged to sense variations in the permeability in the magnetostrictive region, and wherein said magnetostrictive region comprises a first layer of a magnetostrictive material provided on the surface of the shaft.

Such magnetostrictive sensors are known and exist in a number of different embodiments. Usually, magnetostrictive sensors according to the above comprise first means comprising a first winding provided in a yoke and extending around the magnetostictive region of the shaft. A current varying in time is arranged to be supplied to the first winding such that a magnetic field varying in time is generated in the magnetostrictive region. The second means comprises in general a second winding, which is provided in the same yoke as the first winding. Hereby, a voltage is induced in the second winding with a value in proportion to the magnetic flux density. Since the permeability of the magnetostrictive region is changed when it is subjected to a torque, the magnetic flux density is also influenced. The voltage induced in the second winding may thereby be used for determining the magnitude of the torque in the shaft.

The differences between different known magnetostrictive sensors are principally the design of the magnetostrictive region and the way to obtain anisotropic properties therein.

U.S. Pat. No. 5,646,356 shows a magnetostrictive sensor for measuring of torque in a shaft. Thin strips of a low resistivity material have been applied to the surface of the shaft having an angle of 45° to the extension of the shaft. The use of this sensor is restricted to measure torque in shafts which consist of materials having good magnetostrictive properties. Since drive shafts only in exceptional cases are manufactured of material having good magnetostrictive properties, the use of this sensor is restricted.

U.S. Pat. No. 5,491,369 shows a magnetostrictive sensor for measuring a torque applied to a shaft. In order to provide such a sensor on a shaft, a plurality of grooves are formed on the circumferential surface of the shaft. Then, the shaft is subjected to a heat treatment such that it receives an increased strength. Thereafter a binder layer is applied before an active magnetostrictive material is provided on the circumferential surface of the shaft. Consequently, the method requires both mechanical treatment and heat treatment of the load-carrying shaft, which makes it less attractive for many applications.

JP 4-221 726 shows a magnetostrictive sensor for measuring torque in a shaft. The sensor comprises a magnetostrictive region having a first layer of nickel which abuts the surface of the shaft and a second layer of permalloy, which is a ferro-magnetic material having a very high permeability, provided on the first layer. After the application of the second layer on the first layer, fine strips of the second layer are removed such that the magnetostrictive region obtains a surface pattern, which gives the magnetostrictive region anisotropic properties.

The second layer must be magnetostrictive for the function of the sensor and a considerable disadvantage is that the second layer also must have a high permeability.

CN 1030642 shows a magnetostrictive torque sensor having a first layer of copper provided on top of a circumferential surface of a shaft and thin strips of a magnetostrictive alloy provided thereon. Also in this case, the applied strips must have a high permeability for the function of the sensor.

JP 10-176 966 shows a magnetostrictive torque sensor which has a first layer of a magnetostrictive material which is provided on a circumferential surface of a shaft. The magnetostrictive sensor here described is based on geometric anisotropy, which is provided since the first layer forms a geometric pattern on the surface of the shaft. The object of this invention is to improve the strength of the first layer regarding breakage and separation. Therefore, the first layer is provided with a gradually decreasing thickness towards its end portions. Thereafter, a second layer of a non-magnetostrictive material is provided such that it extends over the end portions of the first layer having a decreasing thickness. Thereby, the strength of the first layer is improved regarding breakage and separation. Consequently, the function of the second layer is only to provide a favourable distribution of mechanical stress in the first layer in a mechanical manner. In the same manner as the sensors according to the above-cited JP4-221 726 and CN 1030642, the applied strips require a high permeability for the function of the sensor.

SUMMARY OF THE INVENTION

The object with the present invention is to provide a magnetostrictive sensor for measuring a torque in a shaft, which sensor is simple to provide on a shaft, provides good measurement results and is possible to provide on existing shafts substantially independent of the manufacturing material of the shaft.

This object is achieved by the magnetostrictive sensor of the initially mentioned kind which is characterised in that said surface pattern is formed by a second layer of a non-magnetostrictive material comprising a low resistivity. Because of eddy currents induced in the first layer, the applied magnetic field decreases (is damped) exponentially with the distance from the surface of the first layer. By choosing a sufficiently thick layer, the properties of the sensor will be dominated by the first layer material and not by the shaft material. By providing a first layer of a suitable thickness on the circumferential surface of the shaft, the influence of the shaft material on the measurement results of the sensor becomes more or less negligible. Thereby, the sensor may be provided on substantially all kinds of shafts and independent of shaft material. Such a magnetostrictive sensor also obtains a good function with a first layer of a material having a relatively low permeability.

According to a preferred embodiment of the present invention, said second layer is provided on the first layer. By providing a second layer of a non-magnetostrictive material on the first layer, the surface pattern which provides the magnetostrictive region with anisotropic properties is obtained. Advantageously, said first layer has a continuous extension in said region. Such a first layer is simple to provide at the same time as it forms a continuous and even underlying surface on which the second layer may easily be provided. Furthermore, such a continuous first layer minimises stress concentrations in the magnetostrictive region. According to an alternative embodiment, the first layer is provided with a non-continuous extension on the surface of the shaft and in that at least any portion where the first layer does not abut the surface of the shaft, the second layer is provided on the surface of the shaft. By providing both the first layer and the second layer on the surface of the shaft in said surface pattern, the magnetostrictive region may obtain a substantially even surface layer.

According to another preferred embodiment said first and second layers are arranged to be applied by an application method which essentially does not introduce heat. By avoiding high temperatures, the strength and tolerances of the load-carrying shaft are not influenced. A suitable application method which does not introduce heat is plating. There exists at least two applicable plating methods for plating metals on an existing element, namely bath plating and selective plating, but also chemical (electro-less) plating is applicable. Advantageously, the surface of the shaft is arranged to be subjected to a pre-treatment before said layers are applied. By such a pre-treatment, which may comprise blasting, shot peening, grinding, pickling, doping or chemical strike, the first layer obtains a sufficient bond to the surface of the shaft. Advantageously, said applied layers are arranged to be subjected to an additional post-plating treatment. Such a treatment may be mechanical and/or thermal for improving the strength of the layers and the properties of the sensor.

According to another preferred embodiment of the present invention, said first layer has a thickness which is larger than the skin depth on the magnetostrictive material. The skin depth of a material is a well known definition in the present technical field and is calculated according to the present formula $$\delta = \sqrt{\frac{2\rho}{\mu\omega}}$$

where

δ=the skin depth,

ρ=the electric resistivity of the material,

μ=the magnetic permeability of the material and

ω=the angular frequency of the applied field.

In a first layer having a thickness of a skin depth, about ⅓ of the applied magnetic field penetrates through the first layer into the underlying shaft material. In order to guarantee a good accuracy of measurement, it is preferable to apply such a thick layer that only a lesser amount of the applied magnetic field penetrates through the first layer into the shaft material. However, providing a first layer thickness which is greater than two skin depths usually contributes very little with respect to the accuracy of measurement since, at two skin depths, only a very small amount of the applied magnetic field penetrates into the underlying shaft material. A greater layer thickness implies in general a higher manufacturing cost. Therefore, a first layer having a thickness between one and two skin depths is optimal for most sensors. However, during circumstances favourable in other respects, a relatively good accuracy of measurement may be obtained also with a thickness of the first layer as little as ¼ of the skin depth of the magnetostrictive material. Advantageously, said first layer comprises at least one or more of the materials nickel, iron or cobalt. In particular nickel has in a pure state or in alloys good magnetostrictive properties, in combination with that it may be applied without difficulty on most kinds of shaft materials by, for example, plating.

According to another preferred embodiment of the present invention, said second layer comprises a material having a resistivity which is lower than the resistivity of the material of the first layer. With reference to the above mentioned U.S. Pat. No. 5,646,356, it is shown that the quotient between the resistivity of the material in the second layer and the resistivity of the material in the first layer as well as the thickness of the second layer are of significance for how well the applied field is aligned with respect to the surface pattern of the second layer. It is suitable that said second layer has a thickness which is smaller than the skin depth in the first layer and larger than the skin depth multiplied by the quotient between the resistivity of the material in the second layer and the resistivity of the material in the first layer. Advantageously, a material in the second layer is chosen which has as low resistivity as possible. With a low resistivity, the second layer may be made very thin. Said second layer may comprise strips arranged in parallel which form an angle of between ±20° and ±75° to a generatrix to the surface of the shaft. For the magnetostrictive region to obtain an optimal anisotropy, said angle should be ±45°. At these angles, the magnetic field coincides at the shaft surface with the principal mechanical stress directions when the shaft is loaded with a torque in either direction. Said second layer may be provided within at least two zones, which comprise strips having different angles. The strips may, for example, have an angle of +45° to said generatrix in a first zone while the strips have an angle of −45° to said generatrix in a second zone. Said strips may extend axially in a continuous way between said zones. The total length of the sensor then becomes minimal. It is also possible that the strips are interrupted between two zones. Advantageously, said second layer comprises one or more of materials copper, aluminium or chrome. In particular copper has a very low resistivity but aluminium and chrome also have a low resistivity. Copper and chrome may be applied without difficulty on top of a first layer of, for example, nickel, by plating.

BRIEF DESCRIPTION OF THE DRAWINGS

In the following a preferred embodiment of the present invention is described as an example with reference to the attached drawings, in which.

DETAILED DESCRIPTION OF PREFERRED EMBODIMENTS OF THE PRESENT INVENTION

Figure 1:
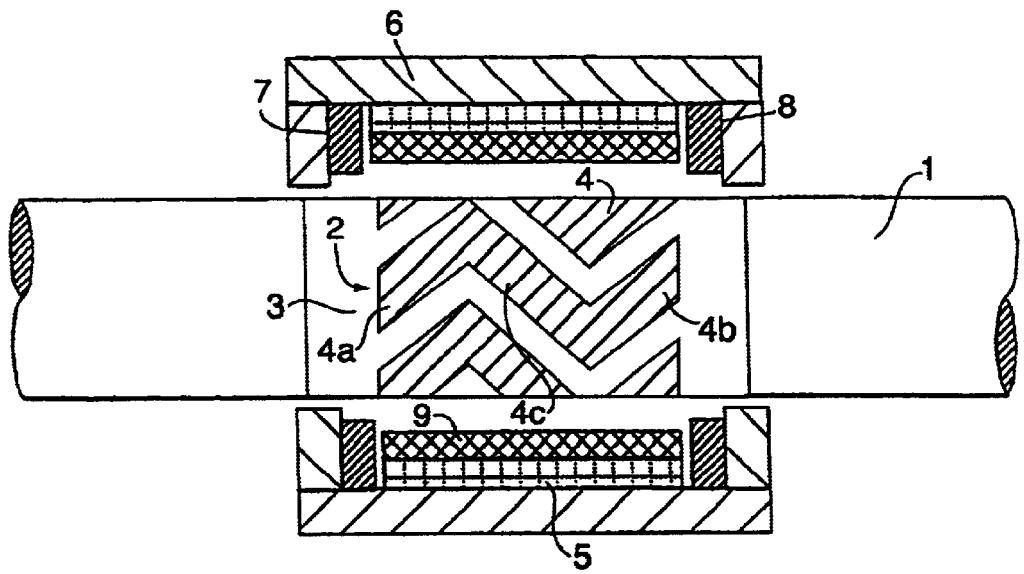
FIG. 1 shows a magnetostrictive sensor for measuring a torque in a shaft according to the present invention and FIG. 2 shows a cross-section of a shaft surface in a magnetostrictive region according to a first embodiment of the present invention.

FIG. 1 shows a rotatable shaft 1, which is arranged to transmit a torque in any kind of mechanical transmission. The shaft 1 may here consist of a substantially arbitrary material, which meets the mechanical demands required on the shaft 1 as a transmission element with reference to hardness, strength and geometry. To be able to measure the size and direction of a torque in the shaft 1, a magnetostrictive sensor has been provided in a suitable place along the extension of the shaft 1. In this case, the magnetostrictive sensor comprises a magnetostrictive region 2 provided on the shaft 1, which has an extension on the circumferential surface of the shaft. The magnetostrictive region 2 comprises a first layer 3 of a magnetostrictive material, which has a substantially continuous extension and thickness in said region 2. Advantageously, the first layer 3 comprises nickel but it may also comprise iron, cobalt and other materials which have suitable magnetostrictive properties. A second layer 4 in form of a continuous strip is provided on the first layer 3. The strip comprises two end portions 4a, b which each form an angle of about +45° to a generatrix to the surface of the shaft 1 and an intermediate portion 4c forming an angle of about −45° to a generatrix to the surface of the shaft 1. The second layer 4 comprises a material with non-magnetostrictive properties and it advantageously has a low resistivity, low permeability and is easily applicable as a thin layer on the first layer. Copper is such a material but it may also be aluminium, chrome or any other material, which has the above-mentioned material properties. The second layer 4 with said strips forms a surface pattern on the first layer 3 such that the magnetostrictive region 2 obtains anisotropic properties. Since the strip has an extension making angles of ±45° to a generatrix to the surface of the shaft 1 an optimal anisotropy is obtained in connection with a torque load on the shaft 1. Such a torque loading may occur in two possible torque directions.

The second layer 4, in FIG. 1, consists of a pattern in form of strips having an angle of either +45° or −45° to the generatrix to the shaft. The second layer 4 forms here a pattern in the form of strips which extend across three zones with different angles. The number of such zones may be one, two, three or more. The zones may either be continuous such that the strips form a continuous unit or separated such that an interruption of the strips is formed between each zone. The underlying first layer 3 may also consist of only one continuous portion or several separated portions. If the first layer forms only one continuous portion or several separated portions, the second layer 4 does not necessarily need to have a corresponding pattern. Consequently, an embodiment may consist of a continuous portion of the first layer 3 and separated strips of the second layer 4. The most preferable embodiment in general, is that having a continuous portion of the first layer 3 and continuous strips of the second layer 4 since that makes the total length of the sensor the shortest possible. This is an advantage since space is often very restricted in the environments where the sensor is used.

Furthermore, a load-carrying shaft may also be provided with several magnetostrictive regions, which enable torque measurement at several places along the shaft. This makes it possible to measure the torque, for example, before and after a torque-transmitting element as, for example, a gear transmission or a pulley. In this way, the transmitted torque in the torque-transmitting element may be calculated as the torque difference between the two magnetostrictive regions. Torque measurement in several places along a shaft may also be of interest on other shafts, which have a varying torque along the extension of the shaft.

In order to generate a time varying magnetic field in said magnetostrictive region 2, the sensor comprises a primary coil 5 which is arranged around the shaft 1. The primary coil 5 is installed in a substantially cylindrically shaped yoke 6 of a soft magnetic material. The yoke 6 also encloses two poles 7, 8, which concentrate the flux in an air gap at the ends of the yoke 6. The primary coil 5 is connected to a signal generator, which is not shown in the figures. The signal generator is arranged to supply a current varying in time to the primary coil 5 such that a magnetic field varying in time with a substantially uniform distribution may be applied to the magnetostrictive region 2. A secondary coil 9 is arranged inside the primary coil 5 to measure the magnetic flux density. When the shaft 1 is subjected to torque, the permeability of the magnetostrictive material is changed in the first layer and thereby also the magnetic flux. Depending on the amplitude of the magnetic flux, a corresponding induced voltage is produced in the secondary coil 9. The induced voltage in the secondary coil 9 is measured and used for determining the size and direction of the torque in the shaft 1.

Figure 2:
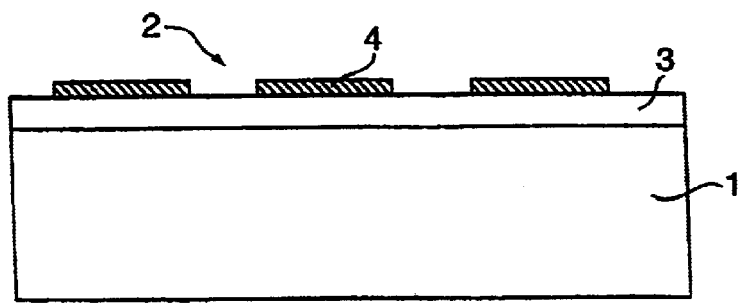

FIG. 2 shows a cross section view through a surface of the shaft 1 in the magnetostrictive region 2. A first layer 3 of the magnetostrictive material has been provided on the circumferential surface of shaft 1 in a relatively thin layer with a continuous extension and thickness. Said first layer 3, which with advantage comprises nickel, is advantageously applied by means of an application method which does not introduce heat during the application process, which for example may be plating. An application method, which does not introduce heat, is favourable since the introduction of heat during the application process may result in that the strength and the manufacturing tolerances of the shaft are changed in an unfavourable manner. In order to ensure that the first layer 3 obtains a necessary bond to the surface of the shaft, the circumferential surface of the shaft may possibly be pre-treated. Such a pre-treatment may comprise blasting, shot peening, grinding, pickling, doping or chemical strike. After the first layer 3 is applied to the surface of the shaft, the second layer 4 is applied on the first layer 3. Consequently, such an application is with advantage performed by plating. In order to obtain the necessary surface pattern for the function of the sensor, the regions which are not intended to be applied with the second layer 4 may, for example, be masked. Conceivable or preferable bath for Ni-plating is a Watt's Bath, a sulphamate bath or a high chloride bath. The plating may be followed by a stabilising heat treatment at between 150° and 300° C. In certain applications a higher temperature may also be considered. Besides the stabilising heat treatment (baking) of the first layer 3, a mechanical post-plating treatment may also be preferable in order to stabilise or improve the properties of the sensor, improve the strength, change inner stresses or improve fatigue strength of the first layer 3. Examples of such additional post-plating treatment are blasting, shot peening, roll polishing or any other corresponding method. The mechanical treatment may be performed either separately or before or after the heat treatment (baking) or in any sequence of treatments consisting of mechanical and thermal treatment.

In order to obtain a sensor that functions well at a relatively low cost, the thickness of the first 3 and second 4 layers are of great importance. Consequently, the part of the applied magnetic field, which penetrates through the first layer 3 influences not only the magnetostrictive material but also the shaft material. Since the shaft material usually has considerably inferior magnetostrictive properties than the first layer 3, a thin first layer 3 decreases the accuracy of the sensor. Therefore, a thick first layer 3 is favourable from the point of view of measurement. However, the cost increases with the thickness of the applied layer. A well-known quantitative parameter in this technical field is skin depth. A skin depth concerns the depth in a material, at which a remainder of about ⅓ (more exactly a factor 1/e) of the applied magnetic field amplitude penetrates further down in the material. A thickness of the first layer 3 between one and two skin depths, usually leads to a very good accuracy of measurement combined with a relatively low cost for application of the first layer 3. However, a relatively good accuracy of measurement may also be performed with a thickness of the first layer 3 as little as ¼ skin depth. With such a thin first layer 3 as ¼ of the skin depth of the magnetostrictive material, (only) 31% of the magnetic flux is in the first layer 3. With a sensitivity (change of permeability caused by mechanical load) in the first layer 3 which, for example, may be 5 times as large as in the underlying shaft material, the first layer 3 will nevertheless dominate the properties of the sensor since 69% of the sensitivity depends on the first layer 3. In that connection such layers 3 as thin as ¼ of the skin depth may be commercially interesting.

In view of cost, it is also preferable to have a thin second layer 4. In order to obtain a sensitive sensor having a thin second layer 4, which forms said surface pattern on the first layer 3, a material ought to be used in the second layer 4 which has a very low resistivity. The second layer 4 ought to be a material, which has at least a lower resistivity than the resistivity of the material in the first layer 3. Advantageously, the second layer 4 has a thickness which is less than the skin depth in the first layer 3 and greater than the skin depth multiplied by the quotient between the resistivity of the material in the second layer 4 and the resistivity of the material in the first layer 3.

In order to improve the properties of the magnetostrictive layer particularly at high loads, it is important how the edge 4 of this layer is designed at the end towards the underlying shaft 1. A suitable design is such that the mechanical stress concentrations are minimised. For small loads, the edges of the layer 4 may be entirely straight, which is shown in FIG. 2, but for higher loads they ought to be designed with a chamfer, a radial transition or any other smooth transition from the layer to the shaft 1. The most optimal design is determined by the performance of the shaft 1, the mechanical stress levels and available space.

Figure 3:
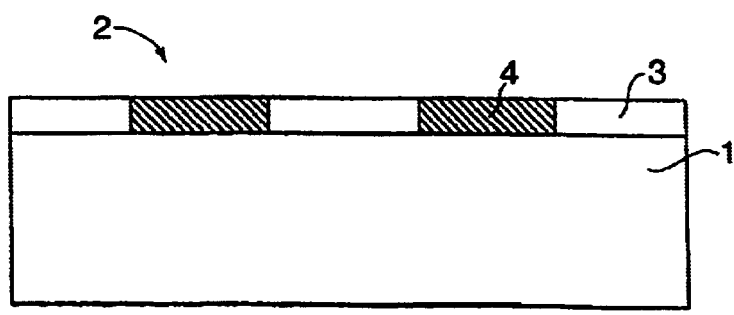
FIG. 3 shows a cross-section of a shaft surface in a magnetostrictive region according to a second embodiment of the present invention.

FIG. 3 shows a cross-section view of an alternative embodiment of a magnetostrictive region 2. The first layer 3 here has been provided on the surface of the shaft 1 with a non-continuous extension. The second layer 4 has been provided on the surface of the shaft 1 in the portions where the first layer 3 does not abut the surface of the shaft 1. Thereby, said first 3 and second 4 layers form a geometrically continuous material layer on the surface of the shaft 1. The first 3 and second 4 layers in the embodiment shown have a thickness of the same size and the magnetostrictive region 2 obtains thereby an even surface.

A torque sensor according to the present invention may be used as a separate component in all such applications where one for different reasons is interested in measuring torque. The torque measurement may, for example, be used for supervision or control or any combination thereof. It may also consist a part of an overload protection.

The torque sensor may be permanently mounted in the machine or mounted on or during the occasion when the torque is to be measured. It may also be integrated directly in a mechanical equipment in such a manner that it consists a part of a load carrying component, which already exists in the machine. This component may be designed according to its original design or may be modified to facilitate the torque measurement. It may also consist of a component which has been supplied in order to enable torque measurement and which is adapted to fit in the mechanical equipment.

The sensor may be integrated in industrial machines such as turning or milling machines, drills, nut runners etc. It may also be used for calibration of other tools or other instruments. Furthermore, it may be used in mixers, extruders, agitators, actuators or viscosimeters. It may also be used in other kinds of manufacturing machines having rotating or non-rotating shafts. In the above-mentioned applications, the torque signal may be used for, for example, supervision and control.

It may also be used in vehicles such as, for example, cars, trucks or construction equipment. It may be used to measure torque in the engine, on the crank shaft, on the input shaft to the gearbox, in the gearbox, on the output shaft from the gearbox, on the propeller shaft, in the differential gear, on the driving shaft, in the wheel or any any other part of the power train. It may be used to monitor the torque or to use the torque to control engine, gearbox, clutch or in any other way influence the power train. It may also be used to measure steering torque in a steering wheel, steering rod or in a steering gear for supervision of the steering torque or to control a power steering.

Furthermore, the sensor may also be used in, for example, bicycles for measuring the performance of the cyclist or to control an electrical or in another manner power assisted bicycle. The torque sensor may also be used in aeroplanes, jet engines, propeller engines or helicopters. Also other applications using torque in rotating shafts as energy transmitting or power transmitting elements may be used with the torque sensor. The sensor may also be used for torque measurement in non-rotating shafts.

The present invention is not in any way restricted to the embodiments shown on the drawings but may be varied freely within the scope of the claims. For example, the first layer may have a continuous extension in the magnetostrictive region with a variable layer thickness. Hereby, the first layer may have a larger thickness in portions between applied second layers. Thereby, the magnetostrictive region may obtain an essentially even surface. Furthermore, such a magnetostrictive region does not need to extend entirely around the circumferential surface of the shaft but may extend only around a part of the shaft. In addition, said primary and secondary windings may consist of the same winding. Except that, the material of said first layer does not necessarily need to be applied as a finished layer material but the possibility exists to use different methods to influence or to change the material of the shaft to form said first layer material. In addition, other methods than plating may be used for applying said first and second layers. Such methods may be physical vapour deposition (PVD), chemical vapour deposition (CVD), plasma spraying, sputtering and laser coating. Preparation of the surface of the shaft and/or additional treatment of said layers may be applicable for these methods as well. Finally, the shaft does not necessarily need to be rotatable but it may also be static.

What is claimed is:

1. A magnetostrictive sensor for measuring a torque in a shaft, the sensor comprising:
   at least one active magnetostrictive region on the shaft;
   a surface pattern on the magnetostrictive region such that the magnetostrictive region obtains anisotropic properties;
   first means arranged to generate a time varying magnetic field in the magnetostrictive region;
   second means arranged to sense variations in the permeability in the magnetostrictive region;

said magnetostrictive region including a first layer of a magnetostrictive material having a relatively low permeability provided on the surface of the shaft; and wherein said surface pattern is formed by a second layer of a non-magnetostrictive material having a resistivity, which is lower than the resistivity of the material of the first layer.

2. A magnetostrictive sensor according to claim 1, wherein the second layer is provided on the first layer.

3. A magnetostrictive sensor according to claim 1, wherein said first layer has a continuous extension in said region.

4. A magnetostrictive sensor according to claim 1, wherein the first layer is provided with a non-continuous extension over the surface of the shaft and in that at least any portion where the first layer does not abut the surface of the shaft, the second layer is provided on the surface of the shaft.

5. A magnetostrictive sensor according to claim 1, wherein said first and second layers are arranged to be applied by an application method, which does not introduce heat.

6. A magnetostrictive sensor according to claim 5, wherein said application method is plating.

7. A magnetostrictive sensor according to claim 5, wherein the surface of the shaft is arranged to be subjected to a pre-treatment before said layers are applied.

8. A magnetostrictive sensor according to claim 1, wherein said applied layers are arranged to be subjected to a post-application treatment.

9. A magnetostrictive sensor according to claim 1, wherein said first layer has a thickness which is greater than ¼ of the skin depth of the magnetostrictive material.

10. A magnetostrictive sensor according to claim 9, wherein said first layer has a thickness which is greater than the skin depth of the magnetostrictive material.

11. A magnetostrictive sensor according to claim 1, wherein the first layer comprises one or more of the materials nickel, iron or cobalt.

12. A magnetostrictive sensor according to claim 1, wherein said second layer comprises a material having a permeability which is lower than the permeability of the material of the first layer.

13. A magnetostrictive sensor according to claim 1, wherein said second layer has a thickness which is less than the skin depth in the first layer and greater than the skin depth multiplied by a quotient of the resistivity of the material in the second layer and the resistivity of the material in the first layer.

14. A magnetostrictive sensor according to claim 1, wherein said second layer comprises strips arranged approximately parallel to one another, which form an angle of between ±20° and 75° to a generatrix to the surface of the shaft.

15. A magnetostrictive sensor according to claim 14, wherein said strips are provided in at least two zones, which comprises strips with different angles.

16. A magnetostrictive sensor according to claim 15, wherein said strips extend in a continuous way between said zones.

17. A magnetostrictive sensor according to claim 15, wherein said strips extend with an interruption between said zones.

18. A magnetostrictive sensor according to claim 1, wherein said second layer comprises one or more of the materials copper, aluminium or chrome.

19. An magnetostrictive sensor according to claim 1 for measuring a torque in a shaft.

* * * * *